Aug. 9, 1955   M. S. WEISBART   2,714,997
LAMINATED TUBULAR BODY AND ELECTRICAL COIL FORM
Filed Feb. 16, 1951   2 Sheets-Sheet 1
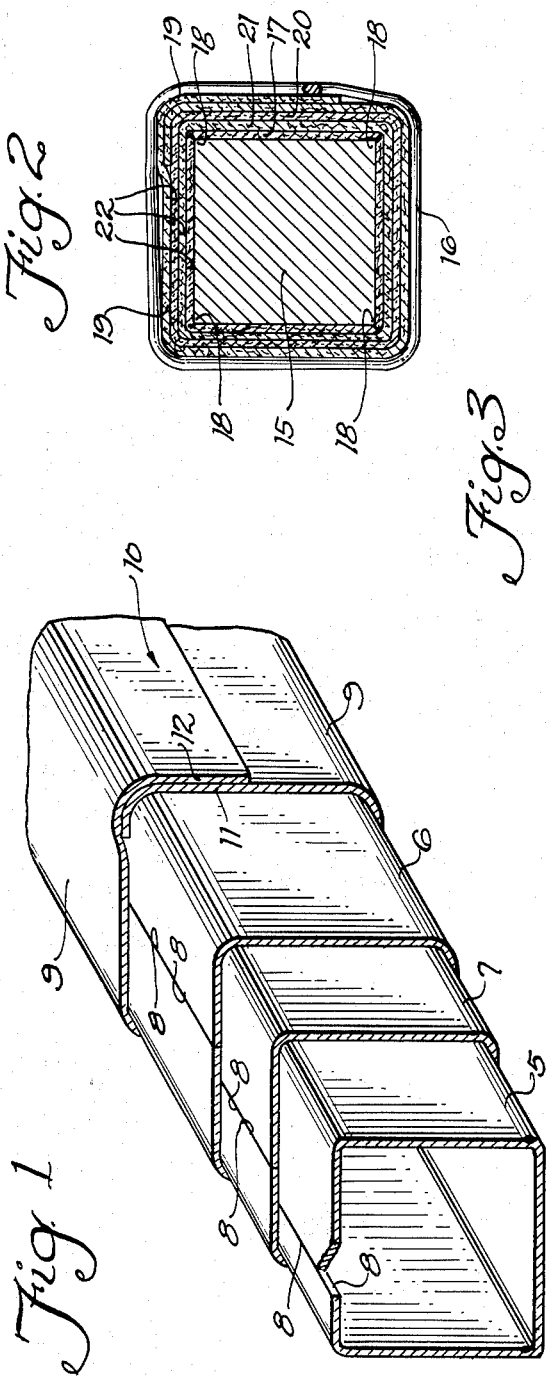
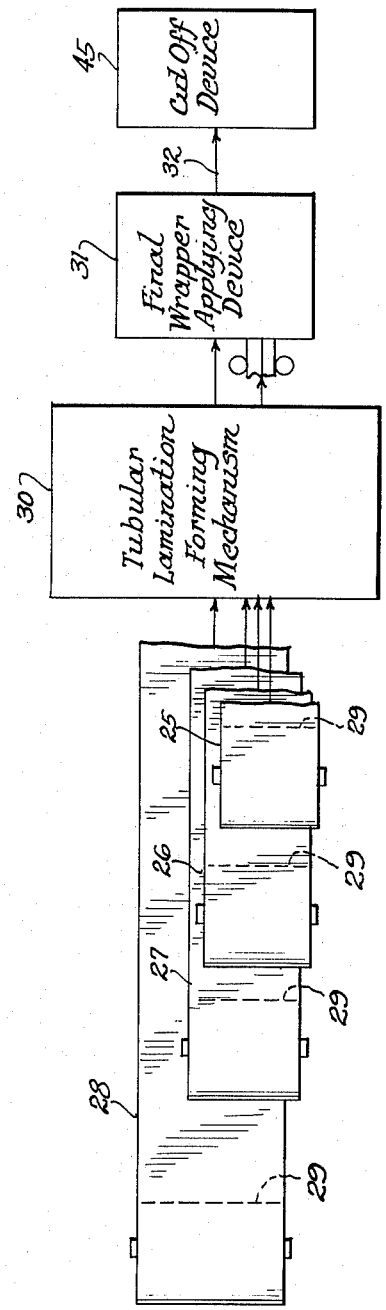
INVENTOR.
Melvin S. Weisbart
BY
Attorney

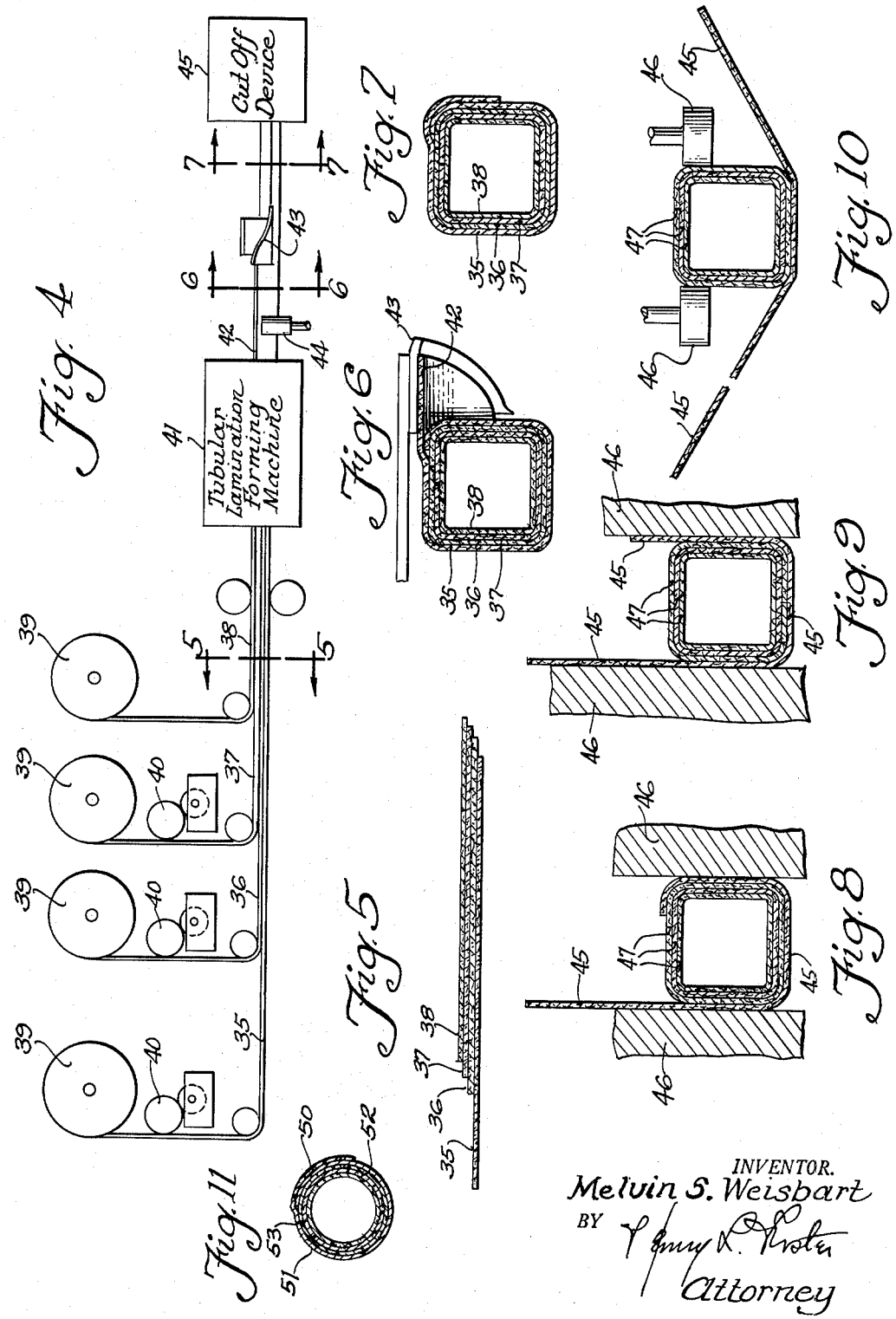

United States Patent Office 2,714,997
Patented Aug. 9, 1955

2,714,997

LAMINATED TUBULAR BODY AND ELECTRICAL COIL FORM

Melvin S. Weisbart, Chicago, Ill.

Application February 16, 1951, Serial No. 211,350

4 Claims. (Cl. 242—119)

The present invention relates to laminated tubular bodies, typically but not exclusively of paper or pasteboard. The structure herein disclosed is highly suited to use for electrical coil forms, since it eliminates certain difficulties encountered in the use of built-up tubes heretofore used as coil forms, but it is useful for any sort of tubular body, especially for service wherein accurate cross sectional shape and dimensioning is required, as well as for service wherein maintenance of cross sectional shape and dimensions against distorting forces is important.

In general, spirally-wound tubing has been used for inexpensive coil forms. Such tubing is subject to longitudinal distortion from axial straightness, and in the case of rectangularly cross sectioned tubes particularly, to distortion from proper cross sectional configuration by longitudinal bending of the tube walls and their departure from transverse straightness. Additionally, under humid atmospheric conditions, spiral tubing, due to release by moisture of stresses under which the tube material is placed during tube-formation, tend to assume corkscrew formations. These distortions occur spontaneously in tubes of this kind, as well as under stresses imposed by winding wire loops onto them. In certain services such distortions seriously affect utility of the tubes. For example, in cored electrical windings, as choke coils and transformer windings, it is the practice to form the windings on the tubular forms with the latter supported on winding arbors, thereafter to remove the wound forms, and slip the forms and windings over the cores. Distortions of the natures described above, of tubular forms, particularly when subjected to the stresses of coil winding, tend to bind the forms on the winding arbors, often necessitating destruction of the coil and form for removal, or rendering it difficult or impossible to slip the wound form onto the magnetically permeable core with which it is to be associated.

A second disadvantage of spiral tubing, specifically applying to use as electrical coil forms, is that the spiral seams tend to open, and, in winding a coil onto a gap-seamed spiral tube the windings tend to become bunched or otherwise displaced from their intended locations axially of the form.

Heretofore, in fields other than those requiring precise maintenance of cross sectional shape and dimensions as in coil forms, it has been proposed to make paper, pasteboard or other laminated tubes, of superposed laminations that extend continuously throughout the length of the tube and longitudinally thereof, each lamination comprising a continuous strip of material transversely formed into a tube, and each having a butted edge seam joint that extends longitudinally throughout the length of the tube and parallel to its axis, and with the seam joint of the outermost lamination covered by a narrow reinforcing strip adhesively secured to the lamination surface along each side of its joint. Experiment with this type of tubing for electrical coil winding form purposes has demonstrated it to have very desirable qualities of absence of spontaneous distortion from axial straightness, but to be even less resistant to cross sectional distortion than spiral tubing, and subject to opening of the butt joints of the laminations. These weaknesses appear to occur particularly under the stresses of coil winding upon sections of the tubing as forms, and they are present even though the seam joints of successive tube laminations are relatively offset peripherally of the tube body.

A second difficulty found to exist in manufacturing this type of tubing is that of maintaining the surfaces forming the butted edge seam joints, which are of quite limited areas, in proper relative positions until the adhesive intended to secure the surfaces together has set sufficiently to hold them relatively motionless.

The present invention relates to an improvement of the longitudinal lamination type of tubing described above, by means of which improvement such tubes are rendered highly resistant to distortion from a cross sectional shape and dimensioning with which they are formed, and without impairing their characteristic of remaining axially straight, while, additionally, very materially reinforcing the butted edge seam joints of the laminations, and also providing an axially smooth and uniform outer tube surface that is highly suited to reception of electrical coil windings. All of these tube body characteristics admirably suit the tube structure to service as an electrical coil form. An intensely practical advantage of the tube structure of the invention lies in the fact that it has an inherent self-securing property that permits its release from all confinement immediately upon completion of formation of the tube, and a material length of time prior to setting or final drying of the adhesive used to secure the tube together.

A primary object of the invention is to provide a novel form of laminated tube having superior qualities of maintaining a selected original cross sectional shape and dimensioning.

An important object is the provision of a tubular body of plural laminations, each extended longitudinally of and throughout the length of the body and having a butted edge seam joint also extended throughout the length of the body and parallel with its axis, with a novel reinforcement that serves effectively to reinforce the seam joints against opening, and also serves to maintain the entire wall structure of the body against distortion from its intended original cross sectional configuration, by maintaining a constant condition of compression of the outermost part of the material of the body.

An additional object is the provision of an inexpensive coil form of novel structural arrangement giving to it qualities of maintenance of a preselected and original internal cross sectional configuration and dimensioning, both against spontaneous distortion and under the stresses of coil-winding thereon, and providing a wholly satisfactory outer surface for receiving electric windings in the formation of a coil.

Other objects are the provision of novel method and apparatus arrangements for making tubes of the novel structure and characteristics herein disclosed.

In the accompanying drawings:

Fig. 1 is a perspective view of a tubular body constructed according to the invention and broken away to show its internal arrangements.

Fig. 2 is a cross section through an iron cored electrical winding, wherein a coil form comprises a section of tubing arranged in accordance with the invention.

Figs. 3 and 4 are schematic diagrams respectively showing in exit end and lateral elevations novel types of apparatus arrangement that may be employed to perform the tube-making method that forms a part of the invention.

Figs. 5, 6 and 7 are transverse sections respectively on lines 5—5, 6—6 and 7—7 of Fig. 4.

Figs. 8 and 9 respectively are schematic transverse sections for method-illustrating purposes, respectively, showing a tube in different stages of formation by one method.

Fig. 10 is a similar transverse section showing an intermediate tube formed by a somewhat different method.

Fig. 11 is a cross section of a cylindrical tube.

Describing the tube structure of the invention in detail, and first referring to Fig. 1, a tubular body is shown, arranged according to the invention. The illustrated tube is rectangular in cross section, but the invention may be practiced equally well with tubing of round, oval or of any polygonal cross section. The body comprises an inner structure which may be one or more of similar inner laminations, shown as including an innermost lamination 5, and an outermost inner lamination 6, and it may include or not include one or more intermediate laminations 7. Each lamination comprises a strip of paper, pasteboard or other flexible material transversely formed to a tube having its longitudinal edges 8 brought into direct abutting contact to form a seam joint that extends parallel to the tube axis throughout the length of the body, or the laminations may comprise substantial bodies of plastic, gummy or other material supported by webs of flexible material such as paper during their formation into tubular form. The successively outward laminations 5, 7, 6 are progressively larger and the inner surface of each more outer one closely overlies and contacts the outer surface of the next inward one. The contacting lamination surfaces are secured together adhesively. As so far described, the laminated inner structure of the tube presents no novelty. Experiment with a tube body arranged similar to that provided by laminations 5, 7, 6, and with the addition of a narrow adhesively attached reinforcing strip bridging the seam joint of the outer lamination, has proved that such a body is unstable against distortion from an original cross sectional form. Additionally, the butted seam joints tend to open very easily after a tube has been formed and the adhesive securing it has fully set.

In accordance with the present invention, these difficulties, inherent in a body constructed of laminations arranged as are laminations 5, 7, 6, are overcome by a wrapper 9, of paper, pasteboard or other material having similar characteristics of flexibility and strength, which wrapper tightly and completely encircles the body of butted edge-seamed laminations, closely contacting the outer surface of the outermost lamination 6, and that is provided with an overlapped seam joint 10 that extends parallel to the axis of the tubular body and throughout the length of the latter. This overlapped joint 10 comprises a first marginal portion 11 of wrapper 9 that lies flat against the outer surface of the outermost lamination 6, in the angular form of tube preferably terminating in spaced relation to a corner about which it extends, and an outer marginal portion 12 of the wrapper that overlies portion 11, overlapping it for a substantial distance extended peripherally of the tube body, and in the angular form terminating well beyond and to the opposite side at the same corner. The inner surface of wrapper 9 is adhesively secured to the outer surface of lamination 6, and the contacting surfaces of wrapper portions 11, 12 are adhesively secured together. Preferably, and as shown, the overlapped joint 10 of the wrapper is offset peripherally of the tube from the butted edge seam joint of the outer most lamination 6.

By closely encircling and containing lamination 6, and by its adhesive securement to the outer surface thereof, wrapper 9 maintains constant the original compressive condition of lamination 6 as it is originally formed into a preselected tubular shape, thereby reinforcing that lamination, and consequently the more inward laminations, and therefore the entire tube, against distortion from its original formed shape and dimensions. Additionally, wrapper 9, by reason of its transverse extent across the butted edge joint of lamination 6, and by reason of its adhesive anchorage to lamination 6 throughout extensive areas to opposite sides of that joint, adequately secures the latter as well as the joints of the more inward laminations against separation.

Fig. 2 discloses a rectangularly cross sectioned core 15 for an electrical winding 16. For accurate fit of a coil form on which winding 16 is wound, to permit easy slip mounting, the form should have an internal configuration closely conforming in shape and dimensions to the external configuration of core 15. A highly satisfactory coil form, arranged in accordance with the present invention, is shown. This form comprises an inner lamination 17 that is so formed in manufacture that its cross section closely conforms to that of the core 15, that is to say, so that the cross section and dimensions of the interior opening of the lamination closely match the external cross section of the core. If the latter has sharp corners as shown, the lamination may be made with matching sharp internal corners by longitudinally scoring as at 18, prior to its formation into tubular form, the surface of the lamination strip that is to become the inner lamination 17 of the coil form. In such case the inherent weakening of the tubular lamination 17, and the consequent weakening of the entire body of longitudinally butted edge seamed laminations is adequately compensated by the surrounding wrapper 19, with lapped seam joint.

As in the tube of Fig. 1, the coil form of Fig. 2 comprises an outermost butted edge jointed lamination 20 immediately surrounded by the wrapper 19. The form also may include or not include one or more intermediate butted edge jointed laminations 21 between the innermost and outermost laminations 17, 20, preferably with their seam joints 22 progressively displaced peripherally of the form.

The wrapper 9 of Fig. 1, and 19 of Fig. 2, performs an important function in the formation of the tube, in that its complete encirclement of the outermost one of the butted edge seamed laminations, and its overlapping inner and outer joint portions, provide a firm anchorage that is effective as soon as application of the wrapper has been completed by formation of its lapped joint, to anchor the inner laminations in the conditions into which they have been formed, even prior to setting of the adhesive applied to them to secure their joints and that applied to secure the wrapper lapped joint. A very slight tackiness of adhesive applied to the latter is sufficient to maintain the over and underlying parts from separating or moving over each other. This eliminates the necessity of employing external means for maintaining the tube body in its original and intended form, after completion of the wrapper joint and prior to complete setting and drying of the adhesive securing the butt joints, and, additionally, eliminates the need for artificial drying. By maintenance of the reach of wrapper that extends across the inner lamination butt joints under tension, which may be done in a tube having corners by extending the overlapping part of the wrapper about an adjacent corner as shown, and in a tube having a smoothly curving periphery by extending the overlapping wrapper portion a substantial distance beyond the butt joint with substantially the same anchoring effect exerted by the curving surface as by a sharp corner. By so arranging the lap joint of the wrapper, the tube structure is made so secure that sections may be cut from it immediately after completing formation of the wrapper joint and prior to drying or setting of the adhesive.

A variety of methods and apparatus may be employed for forming plural webs into a structure of telescoped tubular laminations with butted edge seam joints and a surrounding wrapper having a lapped joint, with all joints extended longitudinally of and parallel to the axis of the structure. General types of such methods and apparatus for formation of tubular bodies of telescoped butted edge seamed laminations, for example, are disclosed by United States Patents Numbers 445,135, 488,384, and 1,634,067. Modifications of such methods and apparatus to perform the present invention, as it relates to method and apparatus, and to form the tubular structure of the invention are schematically disclosed by Figs. 3 to 10, and hereinafter described.

In Fig. 3, a plurality of inner butted edge joint lamination-forming webs 25, 26, 27, and a wrapper-forming web 28 are continuously drawn from supply reels 29 and fed to a tube-forming machine 30. The tube-forming method and machine may be of the general type disclosed by the Denney Patent 445,135, wherein outer laminations are formed successively over previously formed inner ones, or may be of the general type disclosed by the Bates Patent 1,634,067 wherein the webs are stacked and adhesively secured together, in proper lateral relation, and subsequently the stack is formed into tubular form. The latter type of method and apparatus is preferred. From the machine 30 the structure advances to a device 31 that completes application of the wrapper by forming its lap joint. Depending upon the particular types of method and apparatus employed, the wrapper may be partly applied by the mechanism 30 and completed by formation of the lap joint by device 31, or the wrapper and inner tube structure may be fed separately to device 31, and the wrapper completely formed about the inner structure by device 31. Upon completion of application of the wrapper, by formation of its lapped joint, the tubular structure, designated 32 in Fig. 3, is released from all form-retaining mechanism, regardless of the fact that the adhesive in the body is fresh and unset. As described above, the lapped joint wrapper maintains the tube in its finished form, serving to prevent both joint separation and spontaneous distortion of the cross sectional shape of the tube.

Fig. 4 discloses schematically an apparatus and a method of preferred types. The webs that are to form the wrapper 35 and the inner laminations 36, 37, 38, are drawn from supply reels 39, by devices 40 the webs have adhesive or plastic lamination body material applied to them, or are moistened if they are coated with dried adhesive, and are formed by suitable mechanism 41 into a structure wherein the inner laminations are of complete tubular form, and the wrapper partly formed to tubular cross sections. From mechanism 41, the structure advances to a device that completes application of the wrapper by forming its lap joint.

The cross sectional form of the wrapper imposed by mechanism 41 may take a variety of forms. In the arrangement of Figs. 4 and 6 the mechanism 41 is assumed to be so arranged that upon completion of the structure of inner laminations 36, 37, 38, the wrapper 35 has a flap 42 projecting laterally beyond a corner of the structure. The device that completes application of the wrapper by forming its lap joint, comprises a horn or plow 43 that has an inner surface for contacting flap 42 and as the tubular structure advances, forming the flap down to overlie the corresponding part of the other wrapper marginal portion. In Fig. 4, the tubular structure, between mechanism 41 and device 43, following completion of the inner structure of butted seam jointed laminations, and while the structure is weak due to the condition of the adhesive, is held against separation of the butt joints, by side guides contacting the opposite sides of the tube body adjacent the side containing the seam joints, to prevent separation of the latter. Such a side guide is shown in Fig. 4 as a roller 44. At the exit side of device 43, the tube is immediately released from all external restraint.

Figs. 8 to 10 show various examples of conditions that the wrapper may have after formation of the inner laminations to tubular form. In each case the wrapper 45 is partially applied, and has one or more unapplied flaps 45. In each case side guide members 46 are arranged to maintain the inner structure against separation of the lamination butt joints 47.

An extremely important function of the reinforcing wrapper with an overlapped seam joint, is performed in a situation wherein relatively short sections of tubing are cut from a tubular structure that is continuously formed as above described and continuously ejected from the exit end of a tube-forming machine. In general, it may be said that in any tubular structure secured by adhesive and formed continuously, a substantial time period has had to be allowed, or artificial adhesive-setting resorted to, between ejection of the tubular structure from the forming machine and transverse cutting of the tubular structure into sections. This has proven to be particularly true in the case of tubular structures of the relatively weak longitudinal butted edge seam jointed kind disclosed by the above-identified patents. In tubular structures of the kind herein disclosed, immediately upon completion of the wrapper by formation of its overlapped seam joint, and prior to setting of the adhesive material, either of the body of one or more butted edge seam jointed laminations, or of the adhesive material that is to secure together the inner and outer plies of the wrapper joint, the tubular structure may be cut transversely by conventional cut-off means, indicated schematically at 45 in Figs. 3 and 4.

As suggested by Fig. 11, the invention may be applied to tubular structures of cross sections other than angular. In such case, the overlapping marginal portion 50 of the wrapper 51 is extended about a curving portion of the laminated inner body structure 52 sufficiently extended from the outer butt joint 53 anchorage to resist the tendency of the butt joints of body 52 to open up while the adhesive is setting.

I claim:

1. An electrical coil form comprising a laminated inner rectangular lamination having inner sharp corners formed by longitudinal scores in its material and accurate transversely dimensioned inner surfaces between said corners, said lamination having a butted edge seam joint extended parallel to the form axis, at least one lamination surrounding and contacting said inner lamination and having a butted edge seam joint extended parallel to the form axis and offset peripherally of the form from said inner lamination seam joint, and a wrapper providing an outer surface for supporting a coil, said wrapper tightly encircling said outermost lamination and having an overlapped seam joint extended parallel to said form axis, and said wrapper comprising a portion extended flat across the seam joint of said outermost lamination, meeting surfaces of said laminations, wrapper and said first and outer portions of the latter being adhesively secured together.

2. A laminated tubular structure, comprising an inner body of originally flexible material of uniform width, laterally formed to tubular shape of uniform cross section throughout its length and having a longitudinal, adhesive butted edge seam joint disposed parallel to its axis, and an external wrapper of originally flexible material completely surrounding said inner body and adhesively secured thereto, said external wrapper having a portion extended across said inner body seam joint and in contact and adhesively secured to said inner body to opposite sides of said joint, and said wrapper having a longitudinal seam joint substantially displaced from said inner body seam joint peripherally of said body, and said wrapper having a single layer thickness throughout a substantial portion of its peripheral extent, said structure provided with an angular corner and wherein said inner body seam joints and at least one edge of said wrapper are spaced to opposite sides of said corner.

3. A laminated tubular structure, comprising an inner body of originally flexible material of uniform width, laterally formed to tubular shape of uniform cross section throughout its length and having a longitudinal, adhesive butted edge seam joint disposed parallel to its axis, and an external wrapper of originally flexible material completely surrounding said inner body and adhesively secured thereto, said external wrapper having a portion extended across said inner body seam joint and in contact and adhesively secured to said inner body to opposite sides of said joint, and said wrapper having a longitudinal seam joint substantially displaced from said inner body seam joint peripherally of said body, and said wrapper having a single layer thickness throughout a substantial portion of its peripheral extent, said structure provided with an angular corner, and wherein said inner body comprises plural laminations each having a longitudinal butted edge seam joint, all of said inner body joints being spaced to one side of said corner and at least one edge of said wrapper being spaced to the opposite side thereof, and the angular distance of spacing between said inner body joint and wrapper edge around said corner being a fraction of their spacing about the opposite side of said body.

4. A laminated tubular body, comprising an inner body of originally flexible material of uniform width, laterally formed to tubular shape of uniform cross section throughout its length and having a longitudinal, adhesive butted edge seam joint disposed parallel to its axis, and an external wrapper of originally flexible material completely surrounding said inner body and adhesively secured thereto, said external wrapper having a portion extended across said inner body seam joint and in contact and adhesively secured to said inner body to opposite sides of said joint, and said wrapper having a longitudinal seam joint substantially displaced from said inner body seam joint peripherally of said body, and said wrapper having a single layer thickness throughout a substantial portion of its peripheral extent, said body provided with a straight, flat lateral surface defined between two angular corners, said inner body joint is located between said corners, and at least one edge of said wrapper is located around one of said corners from said inner body joint.

References Cited in the file of this patent
UNITED STATES PATENTS

| Number | Name | Date |
|---|---|---|
| 878,104 | Wardwell | Feb. 4, 1908 |
| 1,927,197 | Alderfer | Sept. 19, 1933 |
| 1,959,426 | Henderson | May 22, 1934 |
| 2,017,611 | Stogner | Oct. 15, 1935 |
| 2,173,859 | Piperoux | Sept. 26, 1939 |
| 2,256,263 | Haycock | Sept. 16, 1941 |
| 2,260,452 | Hart | Oct. 28, 1941 |
| 2,339,432 | Stahl | Jan. 18, 1944 |
| 2,359,604 | Atwood | Oct. 3, 1944 |
| 2,472,603 | Mayer | June 7, 1949 |
| 2,623,445 | Robinson | Dec. 30, 1952 |